(No Model.)

5 Sheets—Sheet 1.

O. WELLS.
CAR COUPLING.

No. 397,675. Patented Feb. 12, 1889.

Witnesses,
F. H. Schott
Fred E. Tasker.

Inventor,
Osburn Wells.
By his Attorney John C. Tasker (No Model.)

5 Sheets—Sheet 2.

O. WELLS.
CAR COUPLING.

No. 397,675.

Patented Feb. 12, 1889.

Witnesses.
F. H. Schott.
Fred E. Tasker.

Inventor,
Osbern Wells,
By his Attorney John C. Tasker (No Model.)　　　　　　　　　　　　　　　　5 Sheets—Sheet 3.
O. WELLS.
CAR COUPLING.
No. 397,675.　　　　　　　　Patented Feb. 12, 1889.
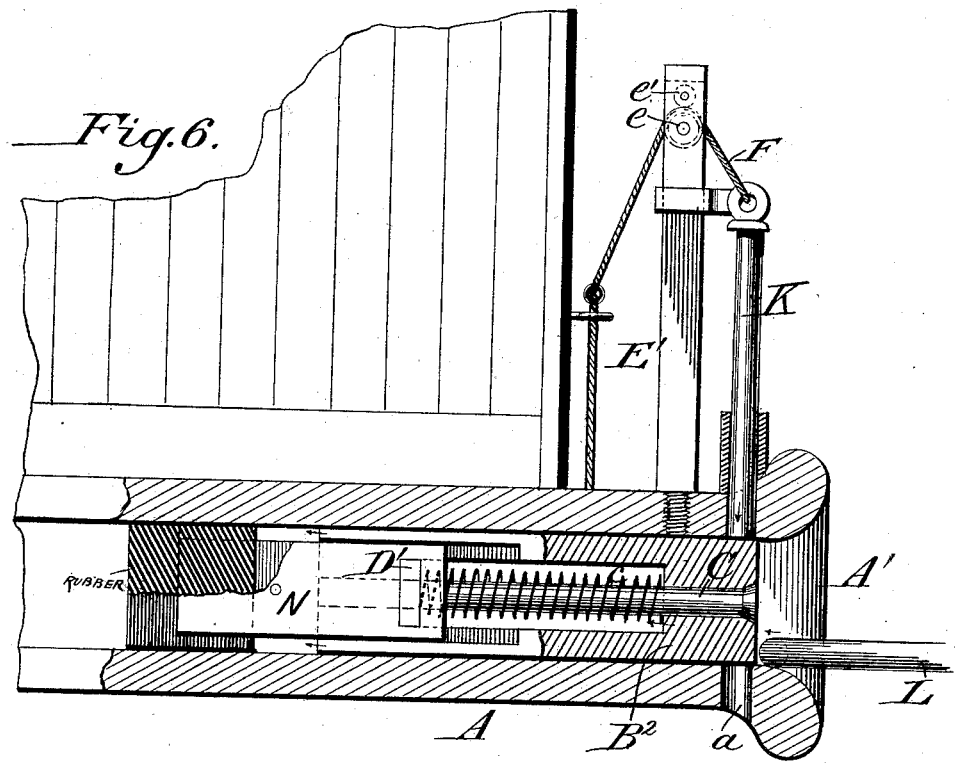
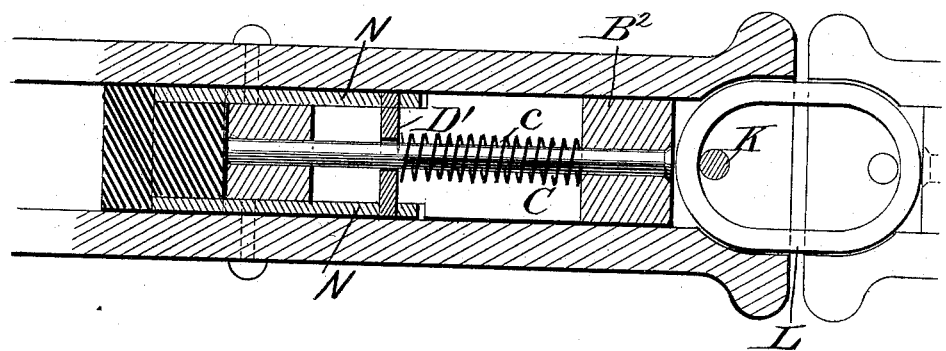

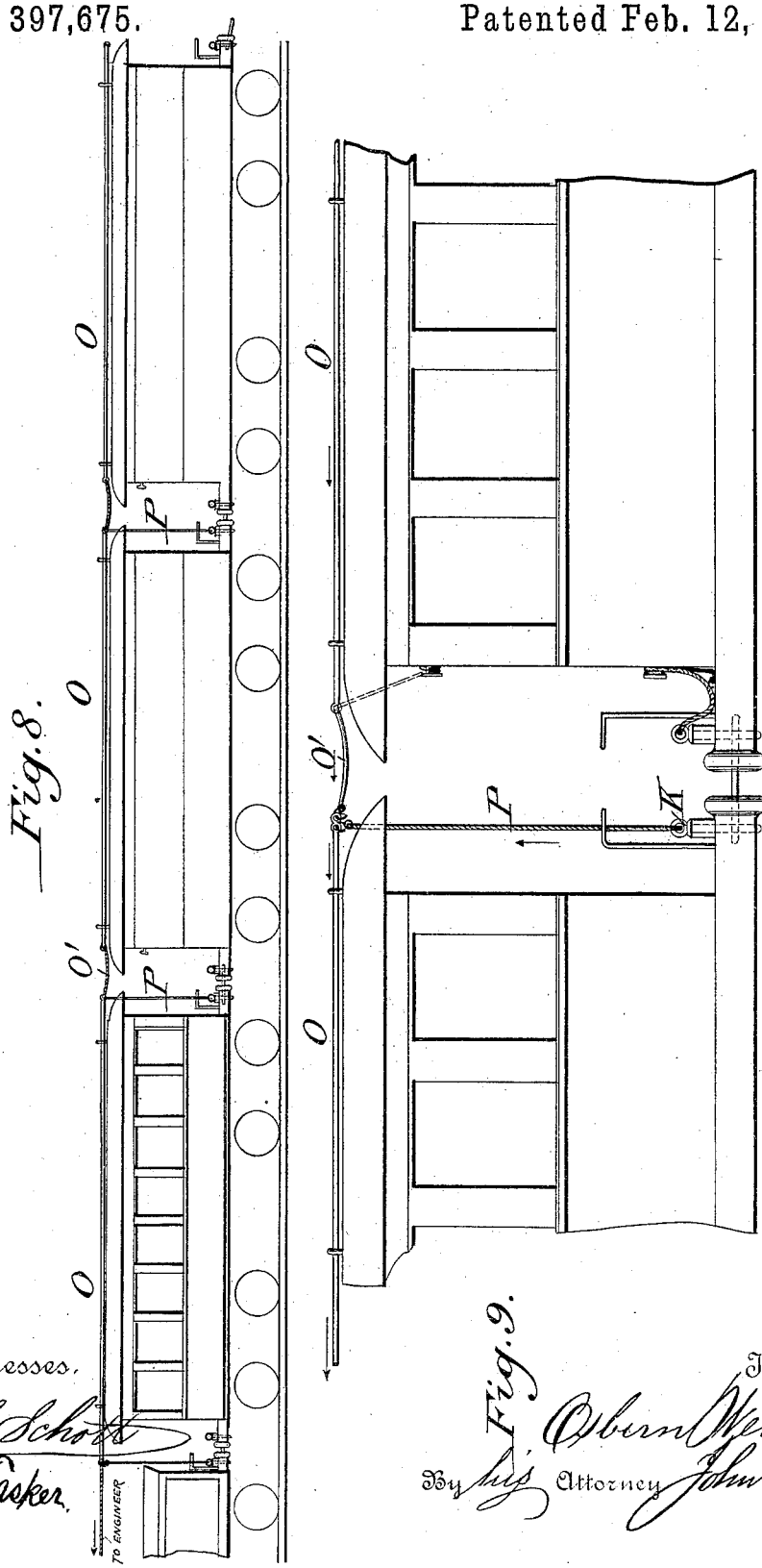

(No Model.) 5 Sheets—Sheet 5.
O. WELLS.
CAR COUPLING.
No. 397,675. Patented Feb. 12, 1889.
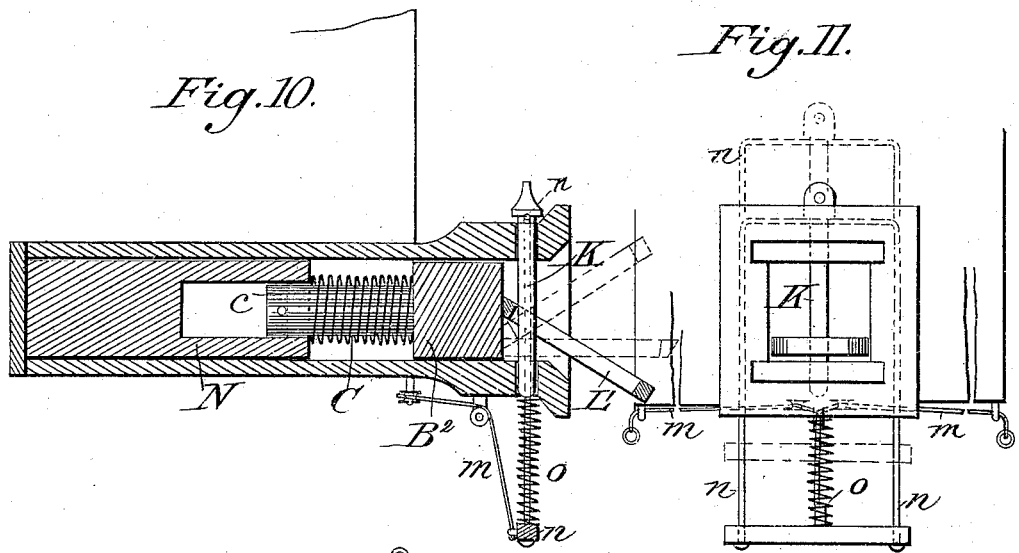
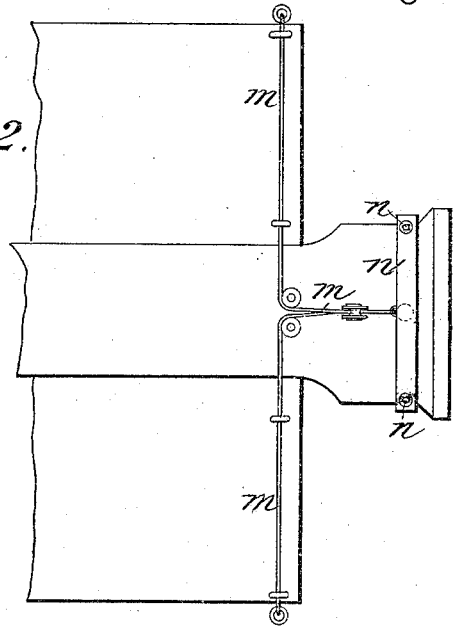
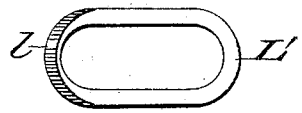
Witnesses
F. H. Schott
Fred E. Tasker.
Inventor,
Osburn Wells.
By his Attorney John C. Tasker

UNITED STATES PATENT OFFICE.

OSBERN WELLS, OF NEWBERRY, SOUTH CAROLINA.

CAR-COUPLING.

SPECIFICATION forming part of Letters Patent No. 397,675, dated February 12, 1889.

Application filed May 8, 1888. Serial No. 273,191. (No model.)

*To all whom it may concern:*

Be it known that I, OSBERN WELLS, a citizen of the United States, residing at Newberry, in the county of Newberry and State of South Carolina, have invented certain new and useful Improvements in Car-Couplings; and I do hereby declare the following to be a full, clear, and exact description of the invention, such as will enable others skilled in the art to which it appertains to make and use the same.

This invention relates to an improvement in car-couplings; and it consists in the construction, arrangement, and combination of parts, substantially as will be hereinafter described and claimed.

Figure 2:
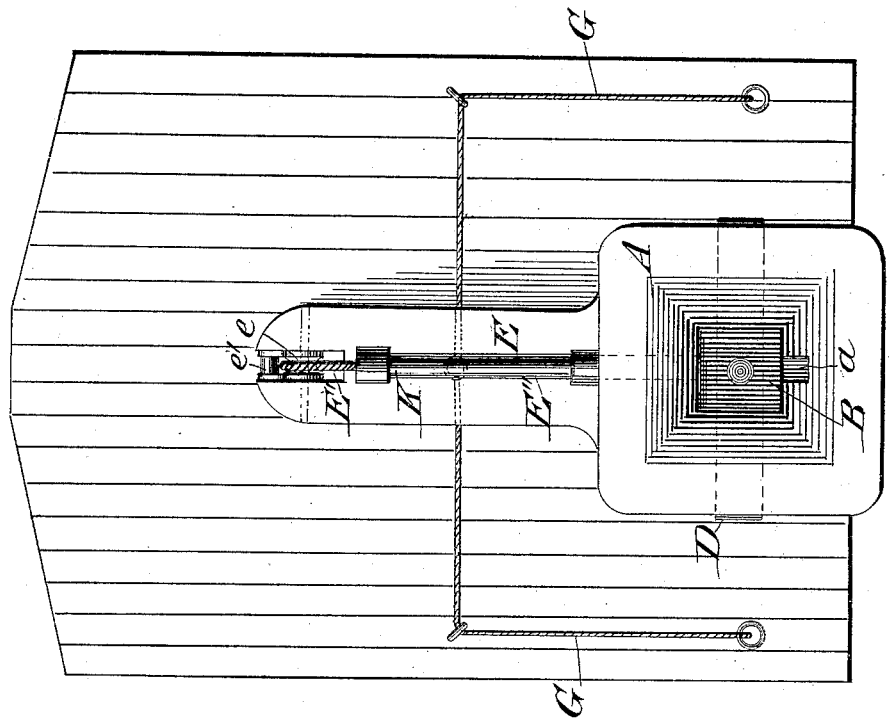
Figure 1:
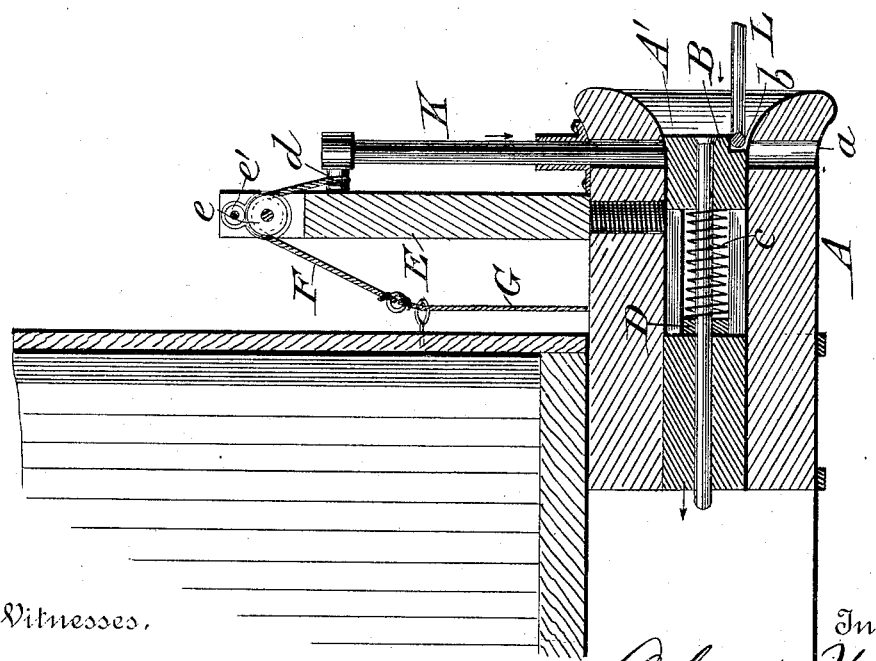
Figure 3:
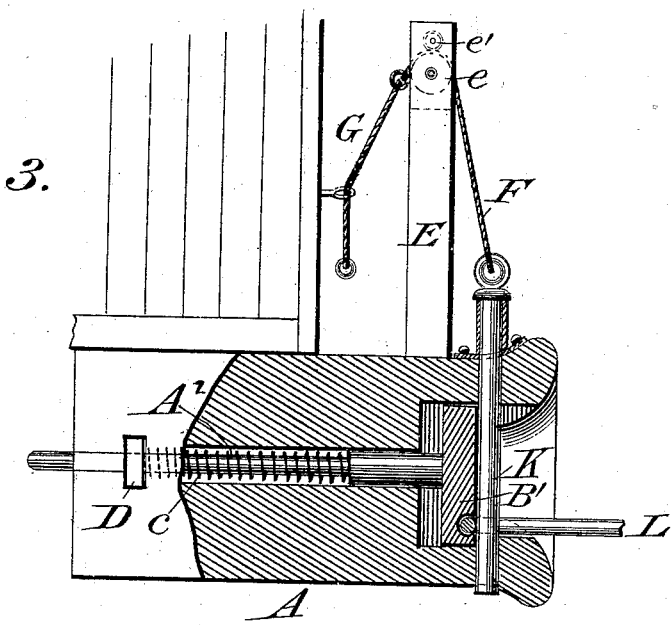
Figure 4:
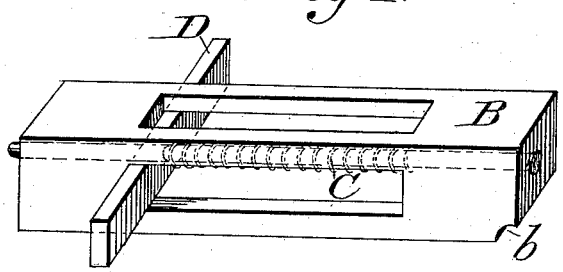
Figure 5:
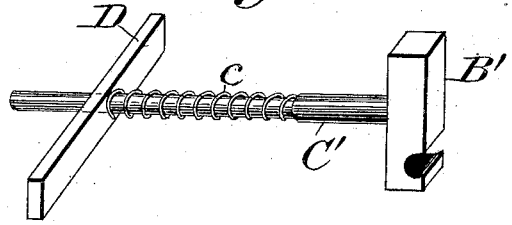

In the annexed drawings, illustrating my invention, Figure 1 is a vertical longitudinal section of my improved car-coupling, shown in connection with a portion of the forward end of a car to which it is applied. Fig. 2 is a front elevation of a portion of the front end of a car provided with my improved coupling. Fig. 3 is a sectional view showing a modification in the arrangement of the parts of the coupling. Fig. 4 is a detail perspective view of the pin-supporting block. Fig. 5 is a similar view of a modified form of the block. Fig. 6 is a vertical sectional view showing a still further modification in the arrangement of the parts of the coupling. Fig. 7 is a horizontal sectional view of the same. Fig. 8 is a side elevation, in outline, of a train of cars provided with my improved devices for uncoupling either one or all the cars simultaneously. Fig. 9 is an enlarged detail outline side elevation of a portion of the same. Fig. 10 is a longitudinal sectional view of my improved car-coupling, showing a modification in the arrangement of the means for elevating and depressing the coupling-pin, and also showing a modification in the structure of the coupling-link. Fig. 11 is an end view of the same. Fig. 12 is a bottom plan view. Fig. 13 is a detail plan view of the improved form of coupling-link.

Similar letters of reference designate corresponding parts throughout all the figures.

A represents the ordinary draw-head, having therein a vertical pin-hole, $a$, near the forward end, containing the pin K, and having also a horizontal slot, A', extending longitudinally through said draw-head. The slot in the draw-head may be of many different sizes and shapes, as will appear from an inspection of the different figures of the drawings. Within the slot in the draw-head is located a sliding pin-supporting block, B, (see Fig. 1,) arranged and adapted to be reciprocated back and forth across the pin-hole $a$, and thus act to uphold the pin or allow it to drop in the manner to be presently set forth. This block may vary in structure. The preferable form is shown at B in Figs. 1 and 4. There it consists of a rectangular skeleton form having solid ends, and with a central longitudinal rod, C, fixed in said ends, around which is coiled a spring, $c$. A transverse bar, D, is placed movable on the rod and in the block, said rod passing through a hole in the bar D. The spring $c$ is tensioned between bar D and the solid front end of the block. The block B is fitted in the slot A' of the draw-head, the transverse bar D being received into a transverse mortise cut in the draw-head for the purpose, and is held stationary therein. The front end of the block is shown in Fig. 1 as lying across the pin-hole. Fig. 4 clearly shows the construction of the block B and the arrangement therewith of the transverse bar D and the rod C.

From this statement of the construction it is obvious that a force applied to the front end of the block B will slide it backward, compressing the spring $c$. Upon the removal of this force the resiliency of the spring will cause the block to rebound into its normal position. The force which retrudes the pin-supporting block consists of the action of the link, as L, which strikes it when two cars collide for the purpose of coupling. The coupling-pin will drop by the action of gravity through the pin-hole when its support is removed, and the block B in returning to its position after the link ceases to push upon it will come in contact with the pin (see Fig. 3) and serve to prevent any possibility of its leaping out of the pin-hole during the rapid movement of the cars.

The block B is preferably provided with a notch, $b$, of sufficient size to contain the thickness of the link, thereby keeping the latter in place, and so located as to receive the impact of the link when the cars come together, In Figs. 3 and 5 are shown a somewhat modified arrangement of the pin-supporting block. The skeleton shown in Fig. 4 is dispensed with, and the slot $A^2$ is smaller in diameter than the slot $A'$. A rod, $C'$, is located in the slot $A^2$, and carries at its outer end a block, $B'$, which plays across the pinhole, and in the recessed end of the pin-head, which recess has a rear vertical wall, (see Fig. 3,) which limits the back-thrust of block $B'$. The transverse bar D is situated with respect to rod $C'$ similarly to what it was respecting rod C, and the spring $c$ is coiled about the rod between bar D and a shoulder on said rod. The operation of this simplified form of the device will obviously be the same as already described in connection with the form shown in Figs. 1 and 4.

In Figs. 6 and 7 is shown still a different modification in the construction and arrangement of the pin-supporting block. In these figures the block is lettered $B^2$. It is constructed substantially like the block B shown in Fig. 4. The transverse bar $D'$, however, which is the equivalent of the transverse bar D in Fig. 4, is stationed in a frame consisting of the side pieces, N N, located within the slot of the draw-head. The pieces N N are stationary, being secured in place by suitable means, and between them and in the rear of them is placed one or more blocks of hard rubber, as will be perceived from inspection of Figs. 6 and 7.

From the foregoing description of the construction it will be apparent that a portion of the block $B^2$ slides between the side pieces, N N, and when at its extreme innermost position strikes against the rubber block. This arrangement of the rubber will be found to be a great advantage, as affording a yielding bed against which the inner end of the pin-supporting block may come in contact. By the use of this rubber the slack of any two cars can be taken up by the constant pressure of the connecting-ring against the pin, and at the same time stand the weight of any train without injury to the spring $c$, which surrounds the rod. One of the chief advantages of my improved car-coupling resides in the fact that it can be easily applied to the draw-heads now in use.

Referring more particularly to that form of the pin-supporting block shown in Figs. 1 and 4, it may be said that all that is necessary in order to provide the draw-head with my coupling mechanism is to shape the block B so that it may enter the usual slot, $A'$, and then provide a transverse mortise in the draw-head to hold the bar D. The rod C may now be displaced within the block sufficiently to permit the withdrawal of bar D, after which the block will be placed in the slot $A'$, bar D slipped through its mortise and through the block B, and then the rod C replaced in the usual position, thus quickly and neatly compacting the whole arrangement, and presenting a cheap and serviceable coupling. Another advantage consists in this, that when a new spring, $c$, is required the block B can be removed from the head and the rod C drawn out of position far enough to remove bar D and the old spring; then the new spring can be properly positioned and the several parts arranged in place as before. Similarly, as will be easily observed, the construction of the pin-supporting block shown in Fig. 5 can be quickly arranged in place, and also that form shown in Figs. 6 and 7.

Upon the draw-head is mounted a standard, E, preferably attached thereto by a screw-tenon, as shown in Figs. 1 and 6. Other modes of attaching it may, however, be adopted, if desired. In one form of the standard it is provided with vertical slots $E'$ $E''$. This form of standard is shown in Figs. 1 and 2. In the upper slot, as $E'$, are journaled a couple of pulleys, $e$ and $e'$, while the lower slot, $E''$, receives, if so desired, a horizontal projection, $d$, with which the coupling-pin is provided, and said slot $E''$ serves as a guide for the projection $d$ during the upward movement of the pin in uncoupling.

Between the pulleys or rollers $e$ and $e'$ passes a rope or cord, F, that is attached to the top of the pin in some suitable manner, and which extends by convenient connections, arranged in suitable guides, to side ropes, G G, on the ends near each side of the car, as shown in Fig. 2, so that the operation of uncoupling may be performed without going between the cars by simply pulling one or the other of these side cords. The pulling on the rope elevates the pin, so that the pin-supporting block may pass beneath it and prevent its descent until in the next act of coupling the link on an adjacent car strikes the support and removes it, allowing the pin to fall.

Instead of the standard being constructed as I have just described, the standard $E'$ (shown in Fig. 6) may be made use of. Here we still have the small pulleys $e$ and $e'$; but instead of having a slot to receive the projection on the pin the standard is surrounded by a collar rigidly connected to the pin near its upper end. The rope F is attached to the pin by being tied into an eye in the upper end thereof.

In Figs. 8 and 9 is shown an arrangement for uncoupling the cars through the removal of the pin from the link. This attachment consists of rods, cords, or cables O O, located in guides on the tops of the cars and running lengthwise of the same. The rods on the different cars are attached together by short connections $O'$, which may be detached as occasion necessitates. The rods O connect with the coupling-pins by ropes or other connections P P, as is clearly shown in Fig. 9. The continuous cable on the top of the car, made up, as I have before stated, of the rods O O and the short ropes or connections $O'$, constitutes a means whereby the engineer can uncouple all the cars simultaneously, or, if he so desires, can uncouple only the rear car. In order to arrange the parts so that only the rear car will be uncoupled, all the ropes will be disengaged from the coupling-pins excepting the one which is attached to the coupling-pin on the last car. Furthermore, if so desired, the continuous cable on the top of the car can be used by the conductor of the train for a bell-cord.

In Figs. 10, 11, and 12 I have represented a modification in the means whereby the coupling-pin is depressed and elevated at the proper time. In said figures, K, as before, denotes the coupling-pin arranged in the pin-hole so as to have a vertical movement. Said pin is attached at its upper end to a rectangular frame, $n$, which surrounds the draw-head. Between the cross-piece at the bottom of this frame and the other side of the draw-head is arranged a spring, $o$, the tendency of which is to force the rectangular frame downward, and in consequence force the coupling-pin downward and hold it in the depressed position. In Fig. 10 the spring is shown holding the coupling-pin in its lowermost position. In Fig. 11 the dotted lines represent the coupling-pin when elevated partially. In order to lift the coupling-pin when it is attached to the frame $n$, as just specified, I arrange cords, wires, or other means, $m$, which pass from the outer sides of the car inward to near the center thereof, where they pass around rollers suitably arranged, said cords or wires $m$ being attached to the lower cross-piece of the frame $n$. In Fig. 12 this arrangement is clearly shown. It will be observed, therefore, that a person standing on either side of the car can, by pulling upon the cord $m$, raise the frame $n$ by overcoming the tension of the spring $o$, and thus lift the coupling-pin so that it will be clear of the sliding block $B^2$. When the sliding block $B^2$ has been forced out by the action of the spring C until it lies across the pin-hole, it will obviously support the coupling-pin. However, when in the act of coupling the link strikes the block $B^2$ and removes it from beneath the pin K, the action of the spring $o$ will be to pull the pin K downward immediately and hold it in this depressed position.

In Fig. 13 I have shown an improvement in the form of the coupling-link, as L'. One end, $l$, thereof is beveled at a suitable angle. It may be beveled either upon the lower or the upper edge, and the angle of the beveling may be as desired. In Fig. 10 the link is shown in one position that it will occupy when thus beveled, and the dotted lines show it in another position, occupying an angle inclined correspondingly in the opposite direction. Furthermore, if the link be reversed it will occupy the other position shown in dotted lines in Fig. 10, where it lies horizontally.

The spring-actuated block $B^2$, pressing upon the link and holding it firmly against the pin K, keeps it in the position which the bevel or inclination upon its end causes it to occupy. Thus by this construction of the coupling-link my improved car-coupling can be used with cars whose draw-heads are situated at different heights.

Having thus described my invention, what I claim as new, and desire to secure by Letters Patent, is—

1. In a car-coupling, the combination, with the slotted draw-head, of a pin-supporting device contained therein and consisting of a skeleton frame having solid ends, a central longitudinal rod located in said frame, a coiled spring around the rod within the frame, and a stationary transverse rod fixed in the draw-head and through the skeleton frame, and against which the spring bears, all substantially as described.

2. In a car-coupling, the combination, with the slotted draw-head, of a pin-supporting device consisting of a rod adapted to slide in said head and carrying a block attached to its forward end, so as to lie across the pin-hole, a spring coiled about said rod, and a stationary transverse bar located in the head and against which the spring bears, substantially as described.

3. The herein-described coupling-link inclined or beveled at one end and square at the other end, substantially as described.

4. The herein-described coupling-link L', beveled at one end, as at $l$, substantially as and for the purpose described.

5. The combination, with the coupling-pin K, of the rectangular frame $n$, surrounding the draw-head, and having a spring, $o$, tensioned between its lower cross-piece and the under surface of the draw-head, and the cords $m$ $m$, whereby the pin K is lifted, substantially as described.

6. The herein-described coupling-link beveled at one end, substantially as described.

In testimony whereof I affix my signature in presence of two witnesses.

OSBERN WELLS.

Witnesses:
JAMES F. GLENN,
SILAS JOHNSTONE.